United States Patent
Kott et al.

(10) Patent No.: US 7,416,663 B2
(45) Date of Patent: Aug. 26, 2008

(54) REPLACEMENT FILTER CARTRIDGE ASSEMBLY HAVING AN INTERNAL LOCK RING

(75) Inventors: Leonard B. Kott, North Massapequa, NY (US); James Tormey, Northport, NY (US)

(73) Assignee: Pleatco Electronic & Filter Corporation, Glen Cove, NY (US)

( * ) Notice: Subject to any disclaimer, the term of this patent is extended or adjusted under 35 U.S.C. 154(b) by 308 days.

(21) Appl. No.: 11/404,999

(22) Filed: Apr. 14, 2006
(Under 37 CFR 1.47)

(65) Prior Publication Data
US 2007/0241040 A1 Oct. 18, 2007

(51) Int. Cl.
*B01D 27/07* (2006.01)
(52) U.S. Cl. ............ 210/232; 210/167.12; 210/437
(58) Field of Classification Search .......... 210/167.1, 210/167.12, 232, 416.1, 416.2, 437, 493.1, 210/493.2
See application file for complete search history.

(56) References Cited

U.S. PATENT DOCUMENTS

| 5,783,067 | A | * | 7/1998 | Belden ............ 210/232 |
| 5,891,334 | A | * | 4/1999 | Gundrum et al. ........ 210/232 |
| 5,928,510 | A | * | 7/1999 | Meredith ............ 210/232 |
| 5,985,142 | A | * | 11/1999 | Belden ............ 210/232 |
| 6,063,276 | A | * | 5/2000 | Felber ............ 210/315 |
| 6,679,990 | B2 | * | 1/2004 | Reinhart ............ 210/232 |
| 2003/0075491 | A1 | * | 4/2003 | Griffiths ............ 210/198.2 |

FOREIGN PATENT DOCUMENTS

EP 0638348 * 2/1995

* cited by examiner

*Primary Examiner*—Fred Prince
(74) *Attorney, Agent, or Firm*—Gerald T. Bodner

(57) ABSTRACT

A replacement filter cartridge assembly for hot tubs, spas and other aquatic environments includes a top end cap, a bottom end cap, a perforated elongated core extending between the end caps, and a pleated filter medium situated between the end caps and disposed circumferentially about the core. The replacement filter cartridge assembly is removably rotatably attachable to an adaptor of a filtering apparatus having a pair of diametrically opposed prongs extending outwardly therefrom. The bottom end cap has a central opening and a pair of diametrically opposed notches situated at the periphery of the central opening. The replacement filter cartridge assembly includes an internal lock ring which is situated on the core at the bottom end cap. The internal lock ring has one or more surfaces which engage the prongs of the adaptor to removably secure the replacement filter cartridge assembly to the adaptor of the filtering apparatus.

6 Claims, 15 Drawing Sheets

REPLACEMENT FILTER CARTRIDGE ASSEMBLY HAVING AN INTERNAL LOCK RING

BACKGROUND OF THE INVENTION

1. Field of the Invention

This invention relates generally to a filtering apparatus, and more specifically relates to a replacement filter cartridge assembly for filtering water in pools, whirlpool-type tubs and other aquatic environments.

2. Description of the Prior Art

A certain type of replacement filter cartridge assembly 102 is particularly used in hot tubs, spas and other whirlpool-type environments. The filter cartridge assembly, which is shown in FIG. 1 in exploded perspective and in FIG. 2 in cross-section, includes a bottom end cap 104 having a central opening 106 formed through the thickness thereof, a top end cap 108 having a handle 110 extending from the outer surface thereof, a perforated cylindrical core 112 extending axially between and bonded to the bottom end cap 104 and the top end cap 108, and a pleated filter medium 114 situated between the end caps 104, 108 and disposed circumferentially about the core 112. This structure provides the replacement filter cartridge assembly 102 with a generally cylindrical shape.

The central opening 106 formed in the bottom end cap 104 includes two diametrically opposed notches 116. The central opening 106 receives an adaptor 118 or "nipple", which is used for removably attaching the filter cartridge assembly to the filtering apparatus. The adaptor 118 includes a threaded base 120 at one axial end thereof for screwing the adaptor into the filtering apparatus, a perforated cage 122 at the opposite axial end thereof which may prevent hair entrapment and for receiving and containing an ion exchange cartridge (ionizer) which may contain cations such as $Ag^{+2}$, silver/copper ($Cu^+{}_2$), copper and the like, a flange 124 extending radially outwardly from the outer circumference thereof which contacts the outer surface of the bottom end cap 104 of the filter cartridge assembly, when the cartridge assembly is properly seated on the adaptor 118, in order to form a water tight seal therewith, and two diametrically opposed bayonet prongs 126 which extend radially outwardly from the outer circumference of the adaptor. The two prongs 126 are dimensioned to be received by the opposite notches 116 formed in the central opening 106 of the bottom end-cap 104.

The prongs 126 of the adaptor 118 and notches 116 of the central opening 106 of the bottom end cap 104 cooperate to define a bayonet-type locking structure. When installing the filter cartridge assembly 102 in the filtering apparatus, the user simply grasps the filter cartridge assembly by the handle 110 on the top end cap 108, senses by feel the alignment of the notches 116 in the bottom end cap with the prongs 126 of the adaptor (which is already mounted in place on the filtering apparatus) and rotates the filter cartridge to misalign the notched portions in the bottom end cap 104 with the adaptor prongs 126. This simple action locks the filter cartridge assembly 102 to the adaptor 118 until it is time to replace the cartridge with a clean one.

The aforementioned replacement filter cartridge assembly works well in most situations. However, under certain conditions, it has been found that the filter cartridge assembly 102 may inadvertently become dislodged from the adaptor 118 within the filtering apparatus.

The adaptor 118 is preferably made from a liner high density polypropylene, while the end caps 104, 108 of the filter cartridge assembly 102 are preferably formed from a linear low density polyurethane. High density polypropylene is used in forming the adaptor 118 because of the intricacies of the adaptor that must be shaped, in particular, the perforated cone-shaped cage 122 which may prevent hair entrapment in the filtering apparatus and which creates an internal cavity to receive an ionizer.

As stated previously, the end caps 104, 108 are more suitably made from a linear low density polyurethane in order to form a strong compression fitting with the component of the filtering apparatus on which it is seated, in this case, the adaptor or nipple 118. A problem occurs when the low density polyurethane filter cartridge end cap is used in a heated aquatic environment with the high density polypropylene adaptor. Spa water temperatures exceed 100° Fahrenheit (F.). The low density polyurethane filter end cap 104, 108 has a greater coefficient of expansion than that of the high density polypropylene adaptor 118. The filter cartridge end caps thus soften and expand to a greater degree than the adaptor in the highly heated spa water, causing the diameter of the central opening 106 in the bottom end cap 104 to enlarge. When the filter pump is turned off, suction on the filter cartridge 102 is released. The filter cartridge, now fitting loosely on the adaptor 118, is free to rotate to a point where the bayonet prongs 126 on the adaptor align with the bottom end cap notches 116, resulting in the filter cartridge 102 becoming disengaged from the adaptor 118 and floating free therefrom within the filtering apparatus.

OBJECTS AND SUMMARY OF THE INVENTION

It is an object of the present invention to provide a replacement filter cartridge assembly which is structured to minimize the chance of becoming dislodged from a mating connector in a filtering apparatus.

It is another object of the present invention to provide a replacement filter cartridge assembly which requires less curing time than conventional filter assemblies before its removal from a mold during its manufacturing process.

It is yet another object of the present invention to provide a replacement filter cartridge assembly which overcomes the inherent disadvantages of known filter cartridge assemblies.

In accordance with one form of the present invention, a replacement filter cartridge assembly is removably rotatably attachable to a mating adaptor or fitting of a filtering apparatus. The adaptor or fitting has a main body and at least one prong extending outwardly from the main body. The replacement filter cartridge assembly of the present invention includes a first end cap, and a second end cap disposed axially opposite the first end cap. The second end cap has a central opening formed through the thickness thereof, and further has at least one notched portion defining a notch situated at the periphery of the central opening for receiving the at least one prong of the adaptor or fitting.

The replacement filter cartridge assembly of the present invention further includes a perforated elongated core extending axially between the first and second end caps. The core has a first axial end situated in proximity to the first end cap, and a second axial end situated in proximity to the second end cap. The filter cartridge assembly further includes a pleated filter medium situated between the first and second end caps and disposed circumferentially about the core.

In accordance with the present invention, the replacement filter cartridge assembly further includes an internal lock ring. The internal lock ring is situated on the core at the second axial end thereof. The internal lock ring has a surface which is engageable with the at least one prong of the adaptor or fitting to removably secure the replacement filter cartridge assembly to the adaptor or fitting of the filtering apparatus.

The surface of the lock ring may include a camming surface, which is preferably at an acute angle with respect to the plane in which the second end cap resides. The camming surface engages the adaptor prong when the filter cartridge assembly is rotatably attached to the adaptor.

Alternatively, the internal lock ring may include at least a first portion having a first width, and a second portion having a second width adjacent the first portion. The at least first portion is in alignment with the at least one notched portion of the second end cap, and the second portion is in non-alignment with the at least one notched portion of the second end cap. The second width of the second portion is greater than the first width of the first portion. When the adaptor is received by the central opening in the bottom end cap, the at least one adaptor prong is received by the notch defined by the notched portion of the second end cap where the width of the internal lock ring is smaller. This allows the adaptor and in particular the prong thereof to be received by the central opening without any substantial interference. Then, when the replacement filter cartridge assembly is turned on the adaptor, the prong will now engage a surface of the internal lock ring at a second portion thereof where the width of the lock ring is greater, creating an interference fit between the adaptor and the second end cap.

In an alternative form of the present invention, the internal lock ring may have varying thicknesses, and include a first portion having a first thickness situated in alignment with the at least one notched portion of the second end cap, and a second portion having a second thickness situated in non-alignment with the at least one notched portion of the second end cap. The second thickness of the second portion is greater than the first thickness of the first portion. With this embodiment, when the adaptor is received by the central opening formed in the second end cap, with the at least one prong being received by the notch defined by the at least one notched portion of the second end cap, the thickness of the lock ring at the notched portion of the second end cap is such that it does not create an interference fit between the adaptor and the second end cap of the replacement filter cartridge assembly, in order to allow the adaptor to be easily inserted into and received by the central opening formed in the second end cap. However, when the replacement filter cartridge assembly is turned on the adaptor, the at least one prong of the adaptor now engages the surface of the lock ring at a second portion thereof where the thickness of the lock ring is greater, thus creating an interference fit between the adaptor and the second end cap of the filter cartridge assembly.

In another form of the present invention, the second end cap of the filter cartridge assembly is made from a material having a first coefficient of expansion, and the internal lock ring is made from a material having a second coefficient of expansion, where the second coefficient of expansion of the lock ring is less than the first coefficient of expansion of the second end cap. Preferably, the second coefficient of expansion of the internal lock ring is close to or the same as the coefficient of expansion of the adaptor or other fitting on which the replacement filter cartridge assembly is mounted. Accordingly, with this particular embodiment of the present invention, if the replacement filter cartridge assembly of the present invention is used in a heated water environment that may cause the second end cap to soften and the central opening formed therein to enlarge, the lock ring, having a coefficient of expansion which is less than that of the second end cap, will not expand as much and, preferably, will be comparable in expansion to that of the adaptor, and therefore maintain a close tolerance and an interference fit between the prong of the adaptor and the lock ring of the replacement filter cartridge assembly, so that the filter cartridge assembly will be less likely to become inadvertently dislodged from the adaptor on which it is mounted.

These and other objects, features and advantages of the present invention will be apparent from the following detailed description of illustrative embodiments thereof, which is to be read in connection with the accompanying drawings.

DETAILED DESCRIPTION OF THE PREFERRED EMBODIMENTS

Figure 1:
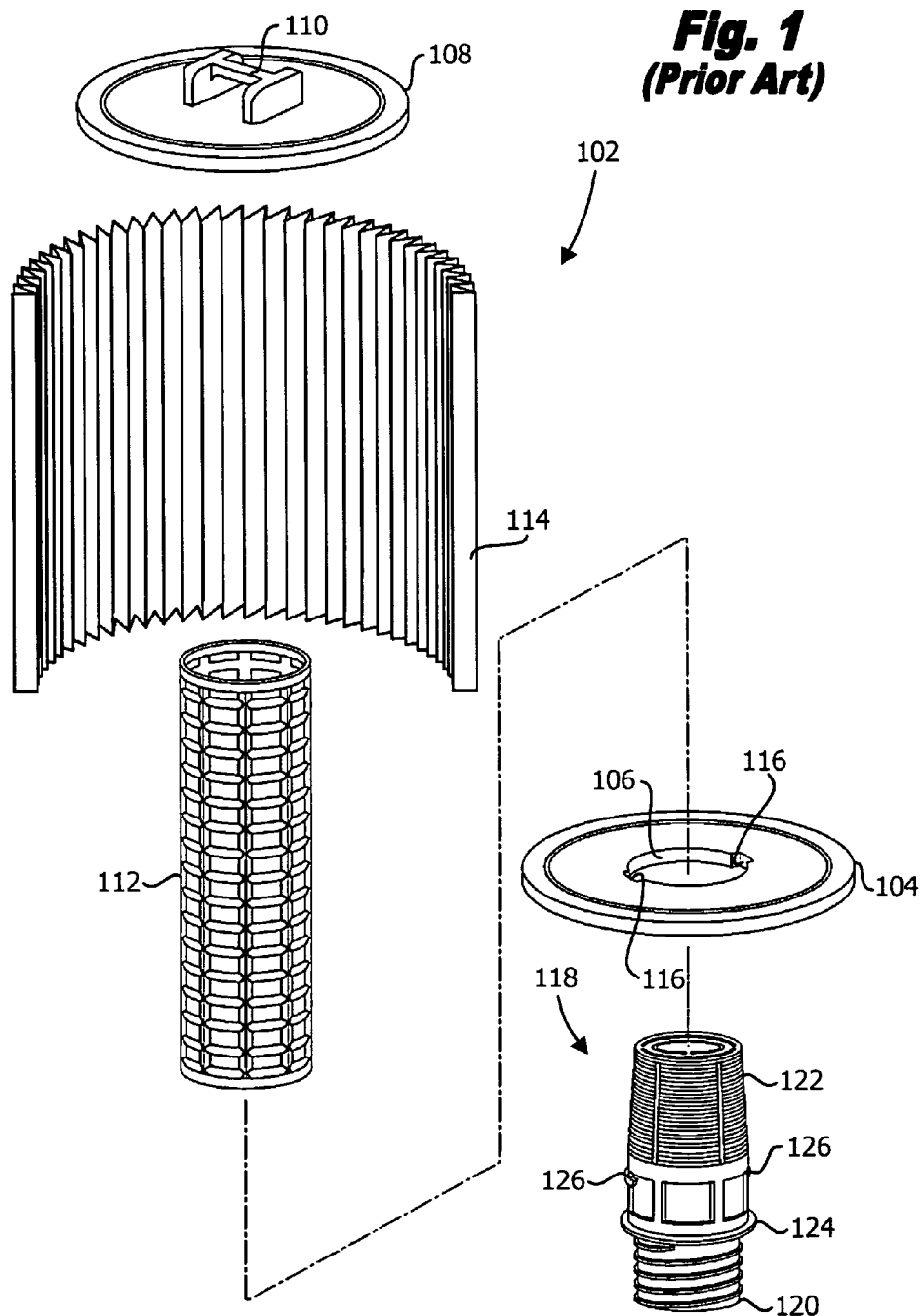
FIG. 1 is an exploded, perspective view of a conventional replacement filter cartridge assembly and an adaptor of a filtering apparatus on which the filter cartridge assembly is removably mounted.
Figure 2:
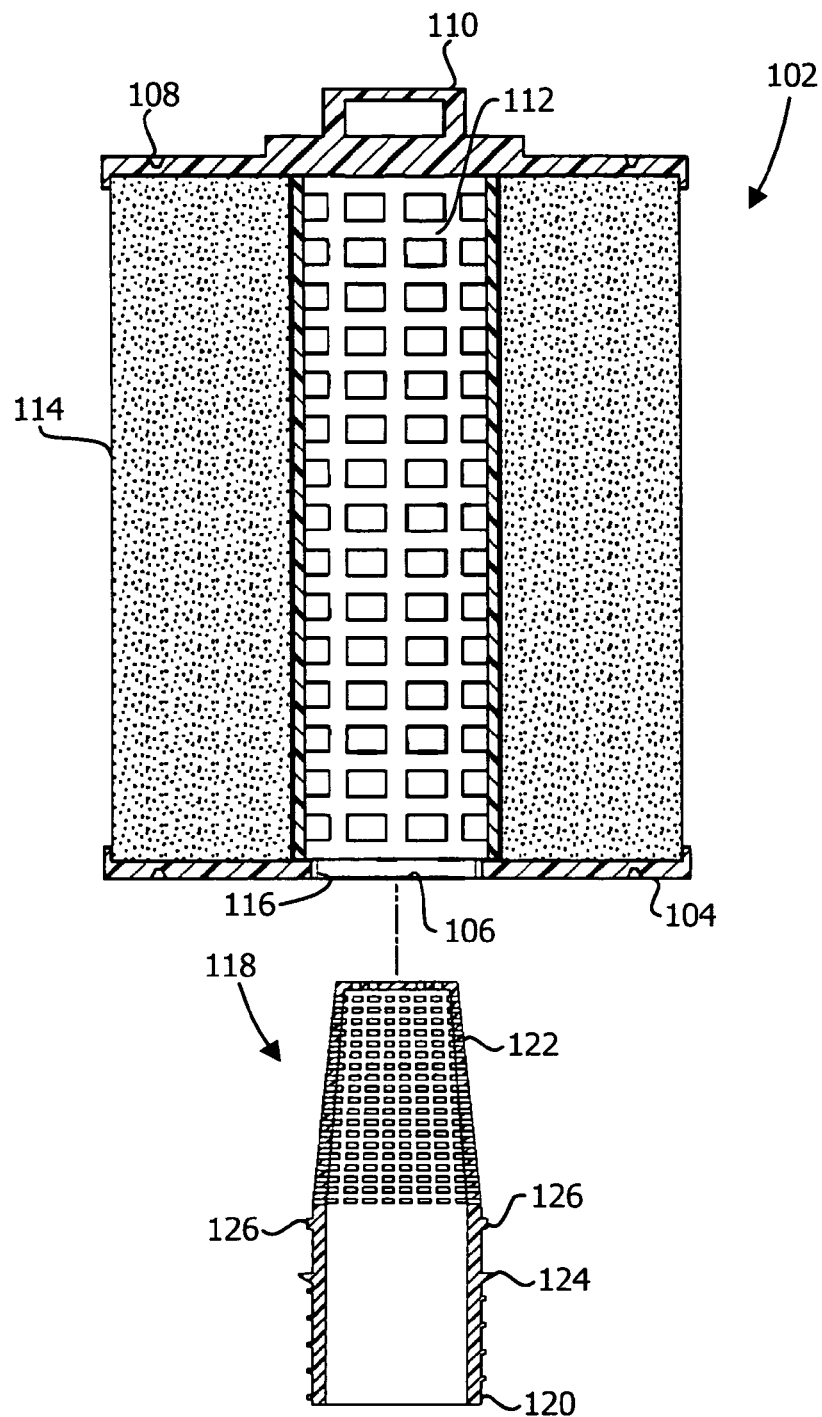
FIG. 2 is an exploded, cross-sectional view of the conventional filter cartridge assembly and the adaptor shown in FIG. 1.
Figure 3:
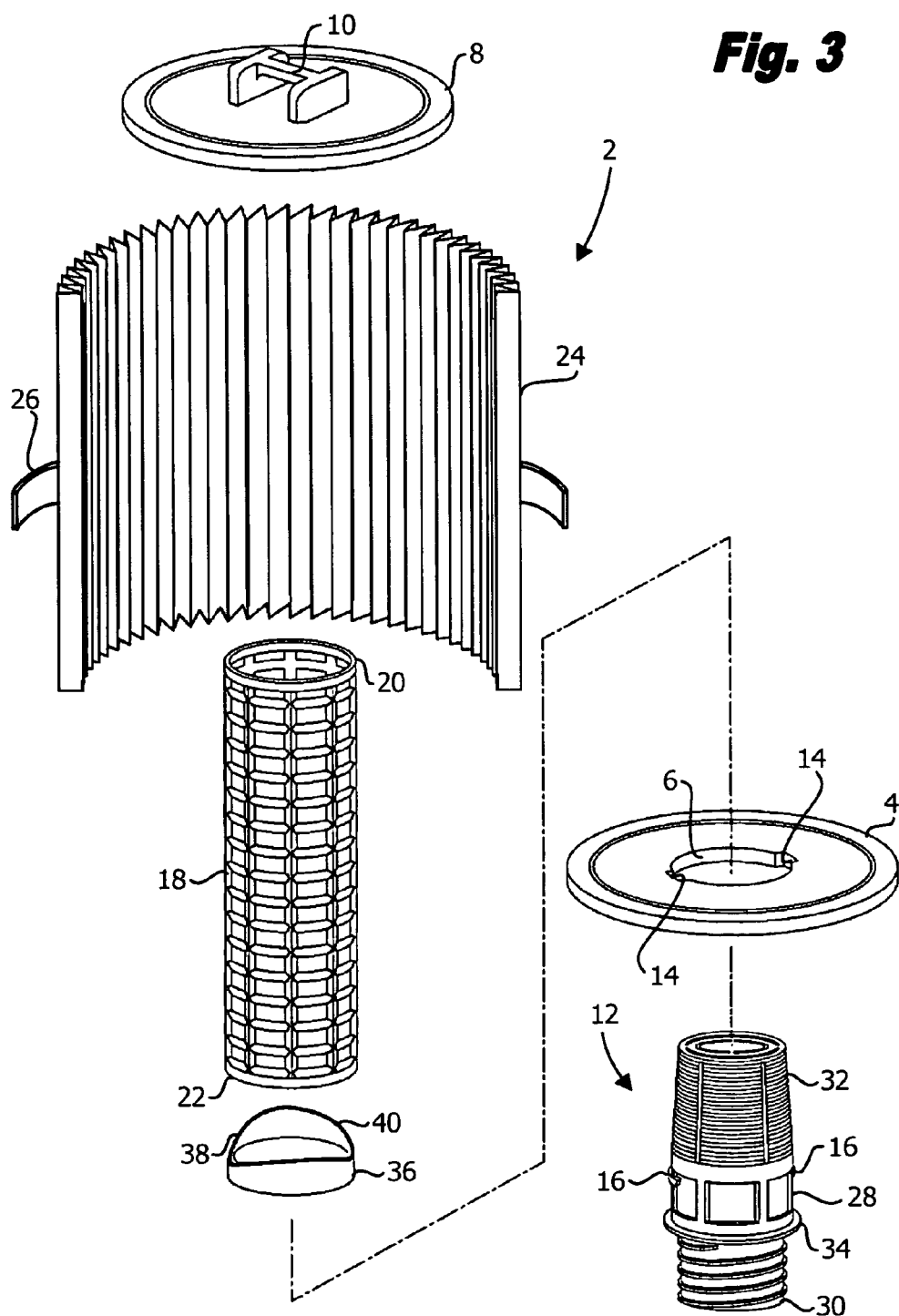
FIG. 3 is an exploded, perspective view of a replacement filter cartridge assembly formed in accordance with a first embodiment of the present invention, and an adaptor of a filtering apparatus on which the replacement filter cartridge assembly is removably mounted.
Figure 4:
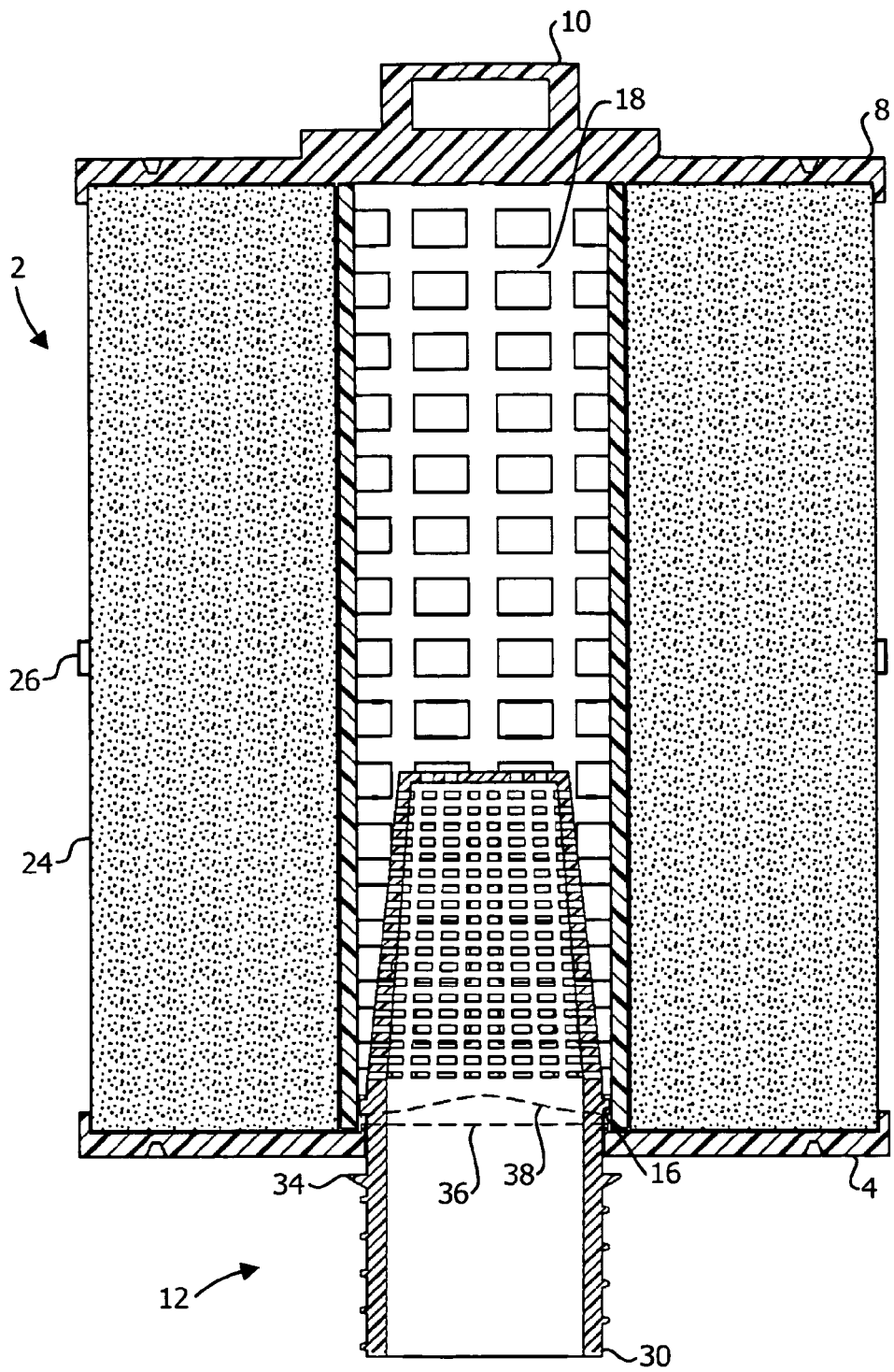
FIG. 4 is a cross-sectional view of the replacement filter cartridge assembly and adaptor shown in FIG. 3, illustrating the filter cartridge assembly mounted on the adaptor in a first position.
Figure 5:
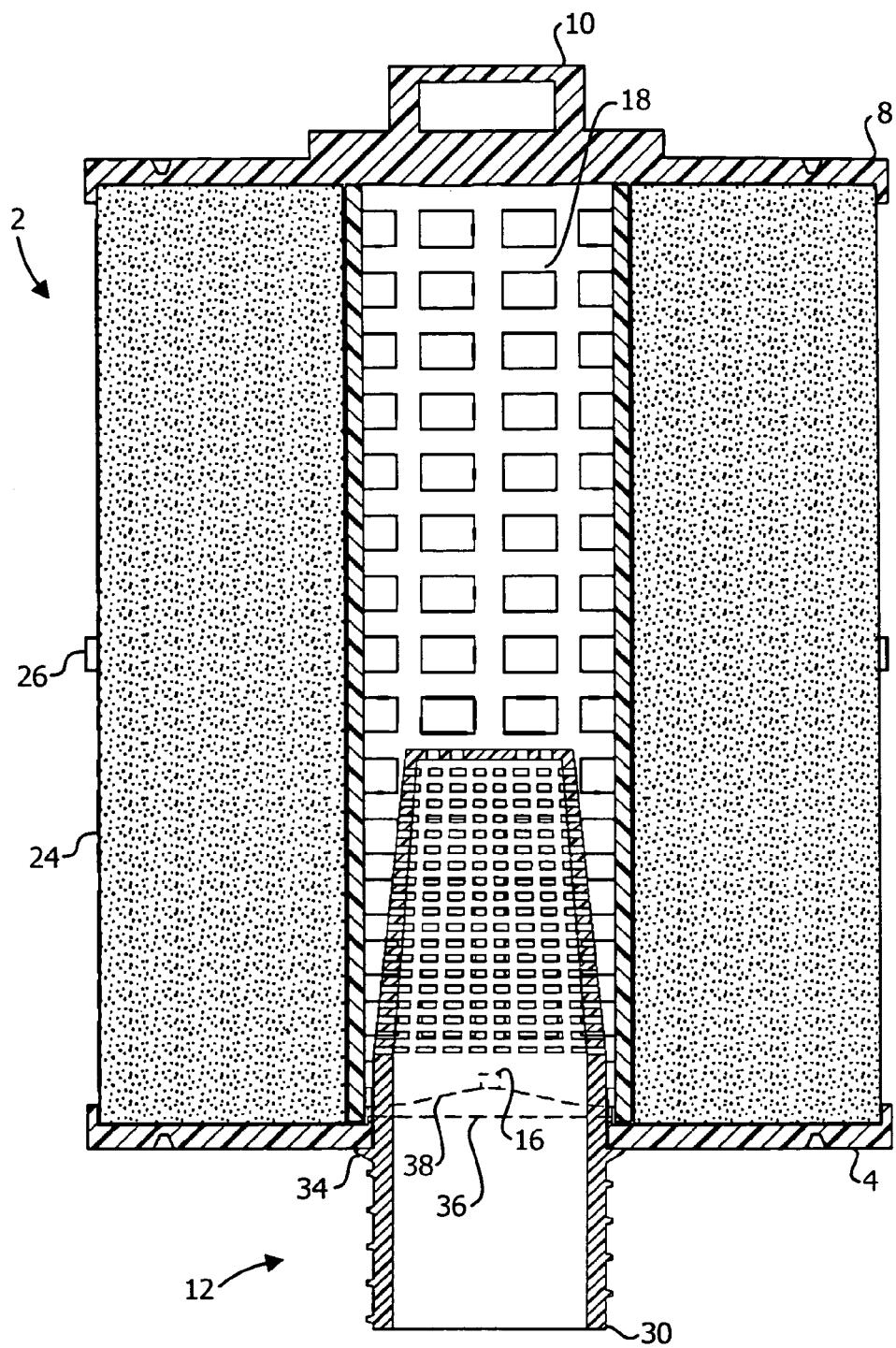
FIG. 5 is a cross-sectional view of the replacement filter cartridge assembly and adaptor shown in FIG. 4, now shown with the filter cartridge assembly turned on the adaptor to a second position.
Figure 6:
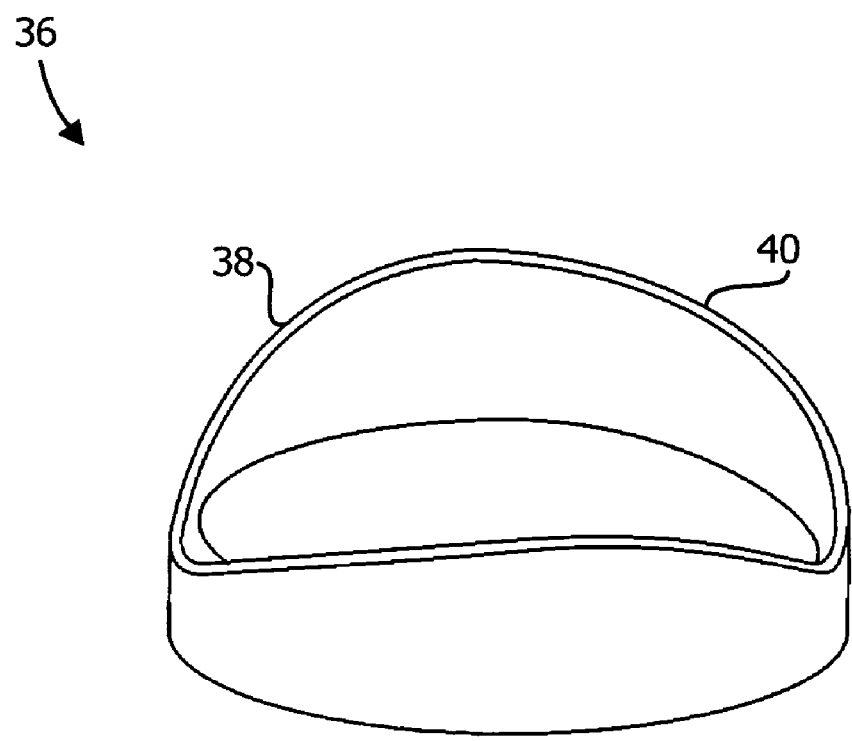
FIG. 6 is a perspective view of a component of the replacement filter cartridge assembly for releasably locking the cartridge in place on an adaptor of a filtering apparatus, such as the filter cartridge assembly and adaptor shown in FIGS. 3-5.
Figure 7:
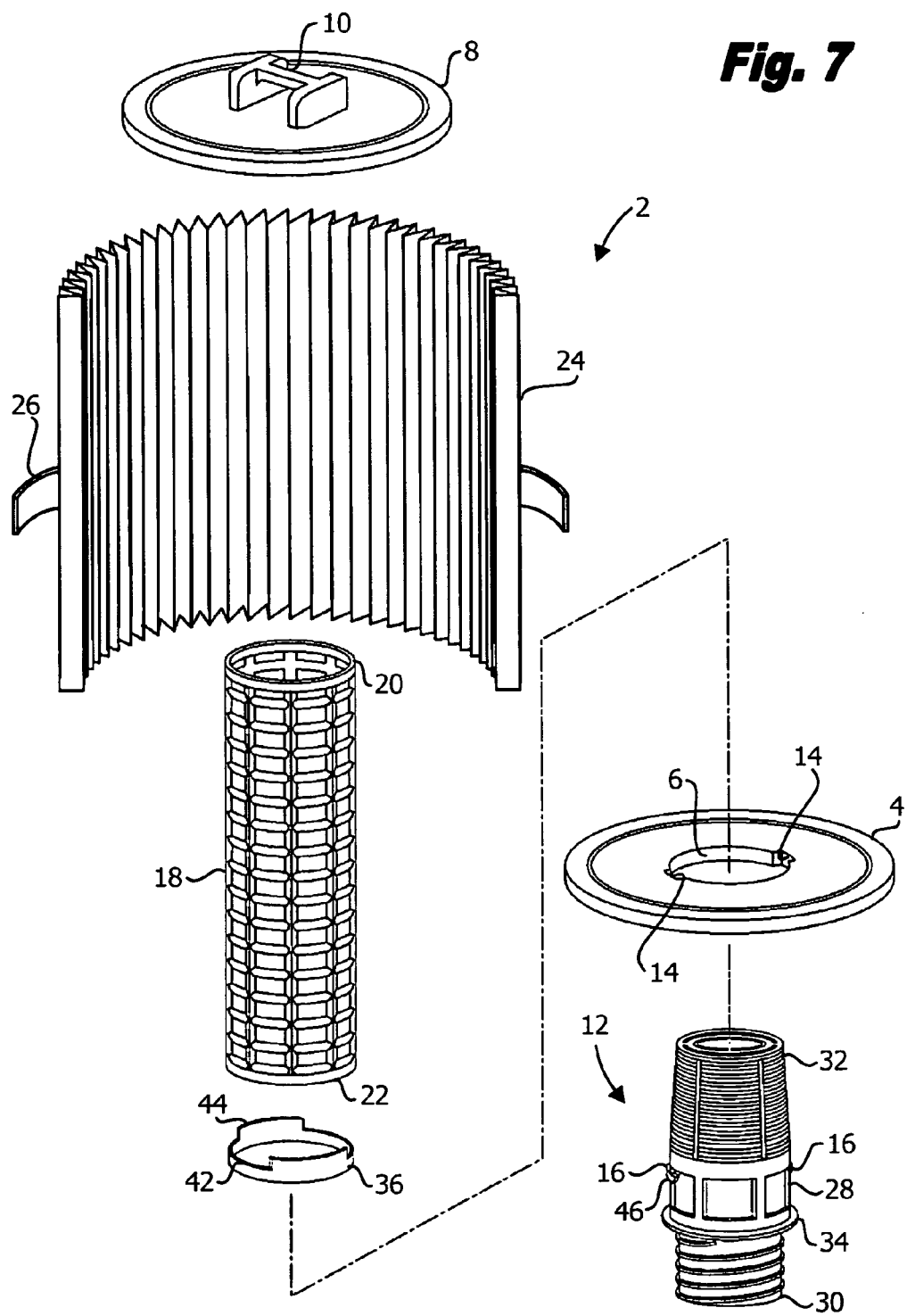
FIG. 7 is an exploded perspective view of a replacement filter cartridge assembly formed in accordance with a second embodiment of the present invention, and an adaptor of a filtering apparatus on which the replacement filter cartridge assembly is removably mountable.
Figure 8:
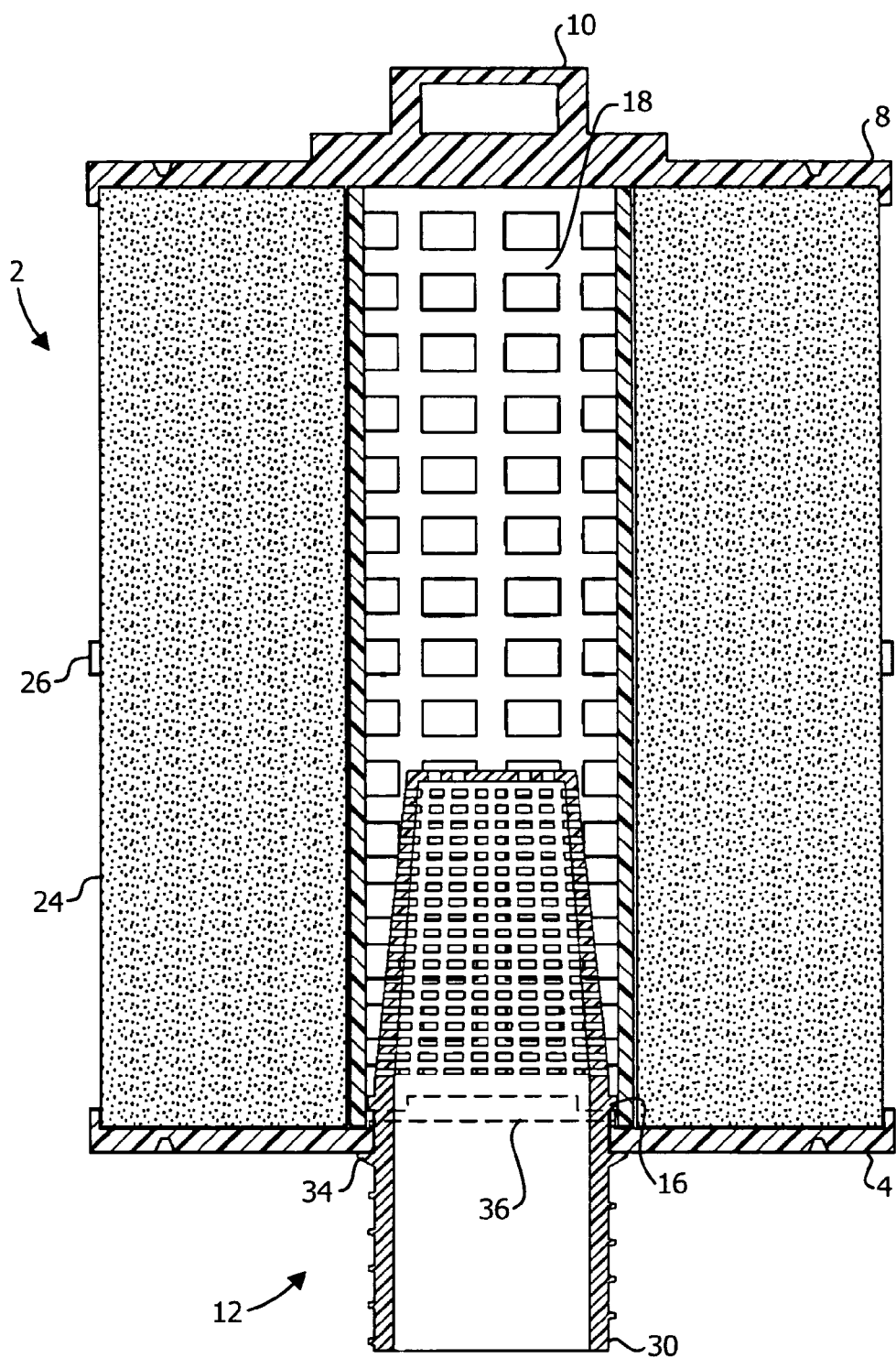
FIG. 8 is a cross-sectional view of the replacement filter cartridge assembly and adaptor shown in FIG. 7, illustrating the filter cartridge assembly mounted on the adaptor in a first position.
Figure 9:
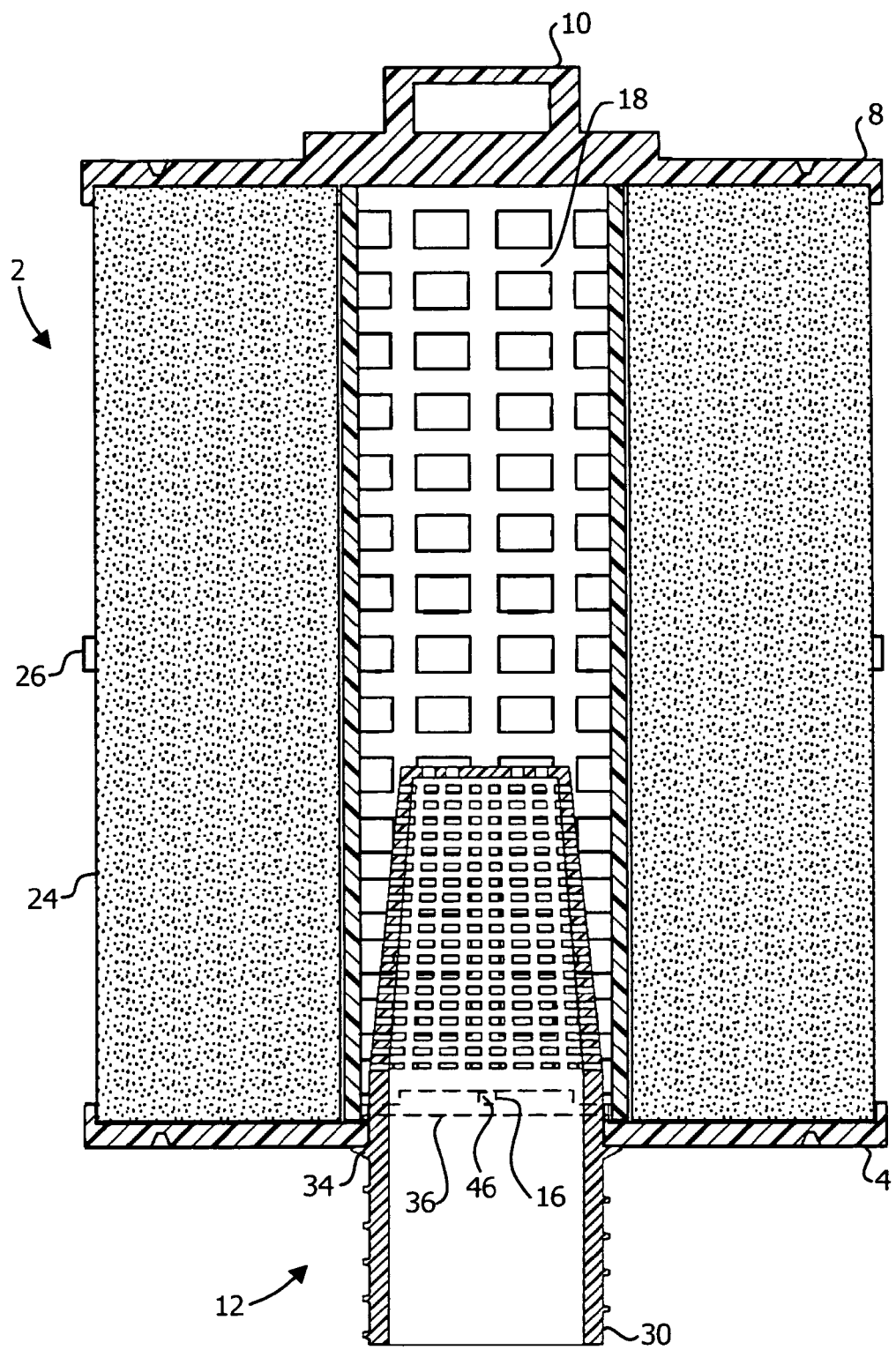
FIG. 9 is a cross-sectional view of the replacement filter cartridge assembly shown in FIGS. 7 and 8, and an adaptor of the filtering apparatus, illustrating the replacement filter cartridge assembly mounted on the adaptor in a second position.
Figure 10:
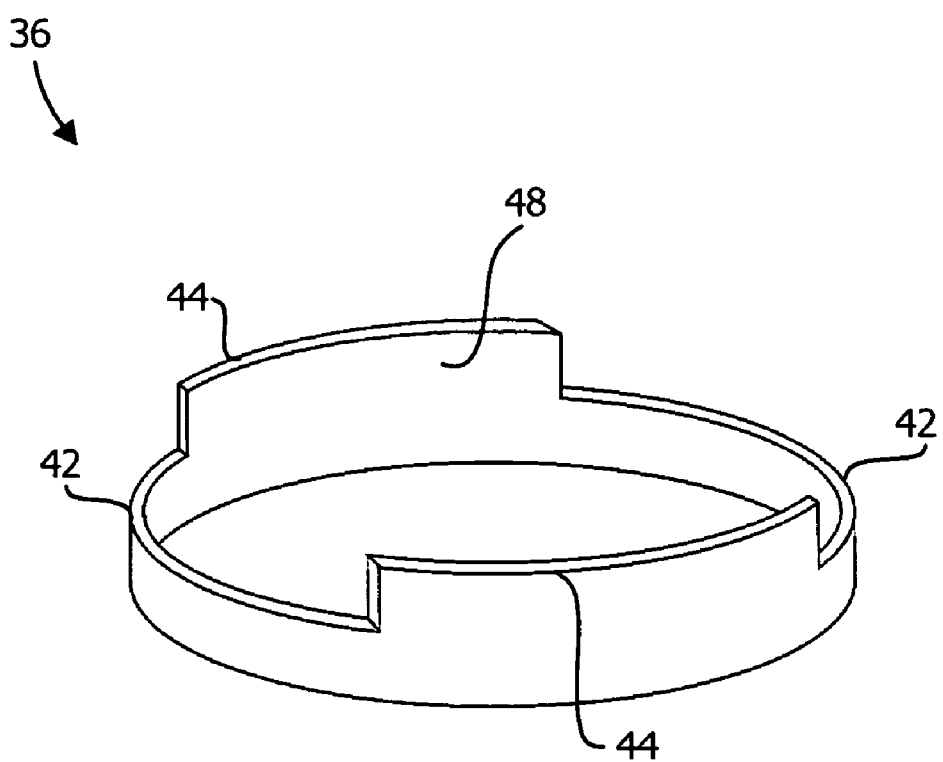
FIG. 10 is a perspective view of a component of the replacement filter cartridge assembly shown in FIGS. 7-9 for releasably locking the replacement filter cartridge assembly to the adaptor of the filtering apparatus.
Figure 11:
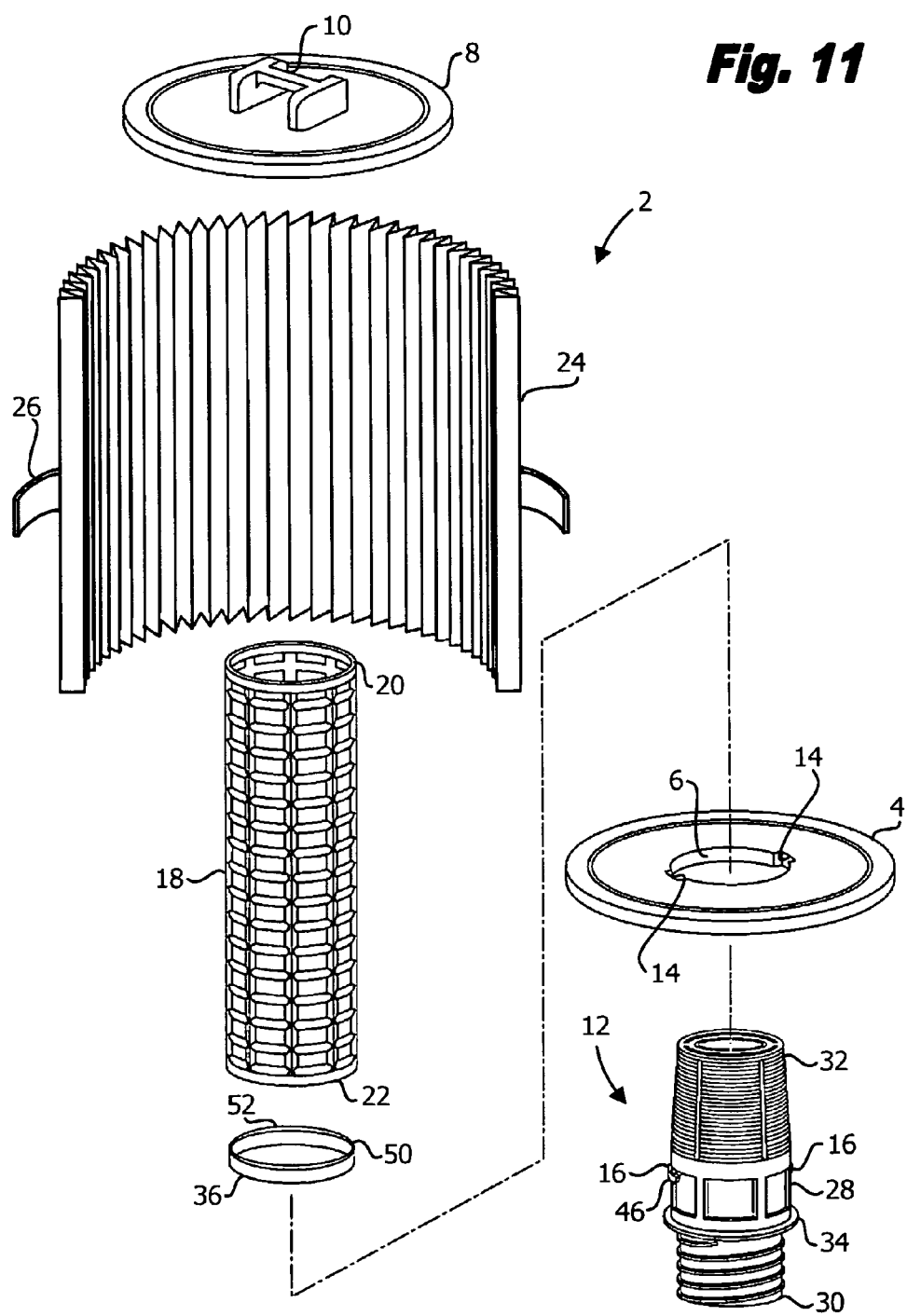
FIG. 11 is an exploded, perspective view of a replacement filter cartridge assembly constructed in accordance with a third embodiment of the present invention, and an adaptor of a filtering apparatus on which the replacement filter cartridge assembly is removably mountable.
Figure 12:
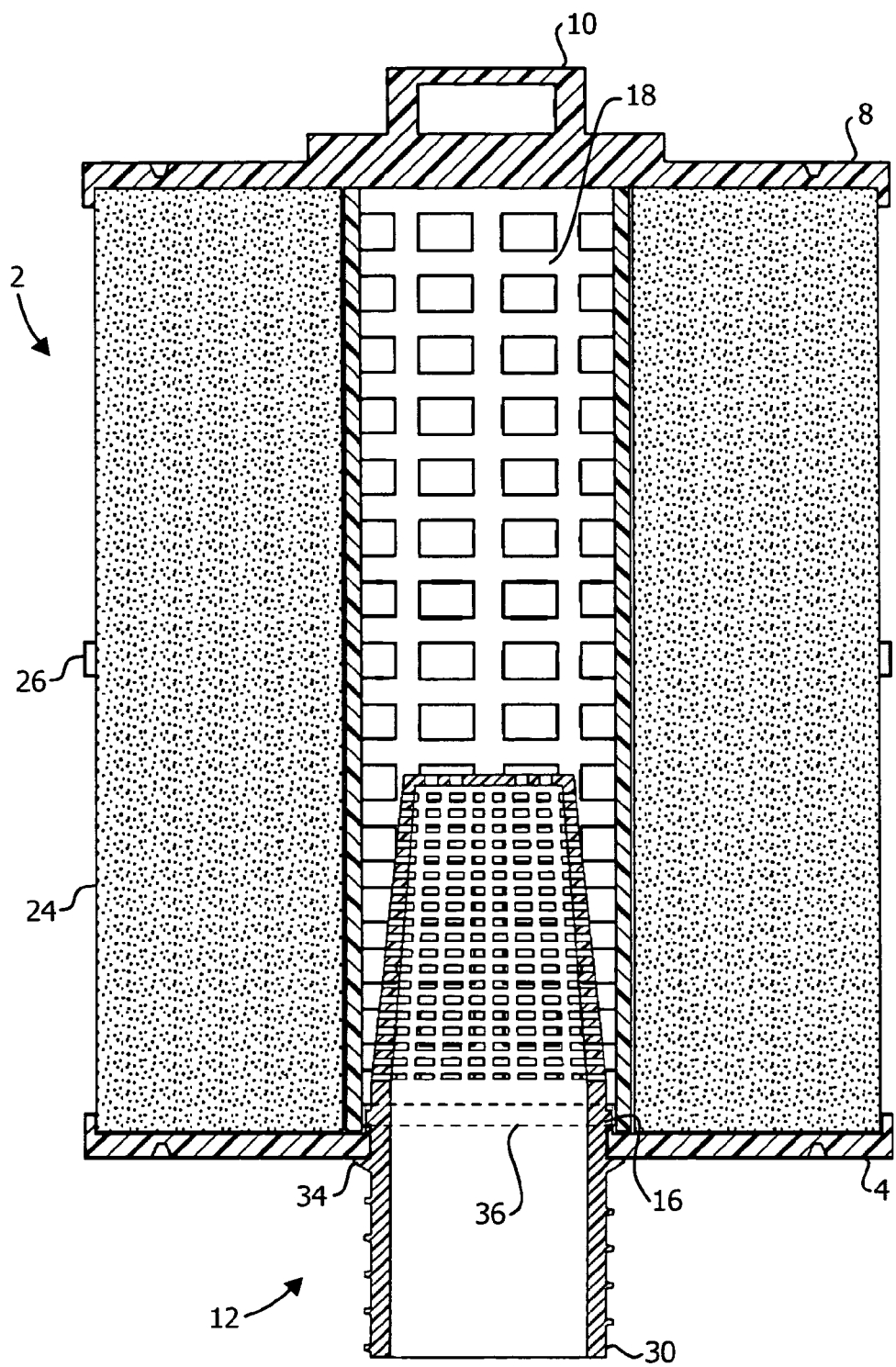
FIG. 12 is a cross-sectional view of the replacement filter cartridge assembly shown in FIG. 11, and an adaptor on which the filter cartridge assembly is removably mountable, illustrating the replacement filter cartridge assembly being mounted on the adaptor of the filtering apparatus in a first position.
Figure 13:
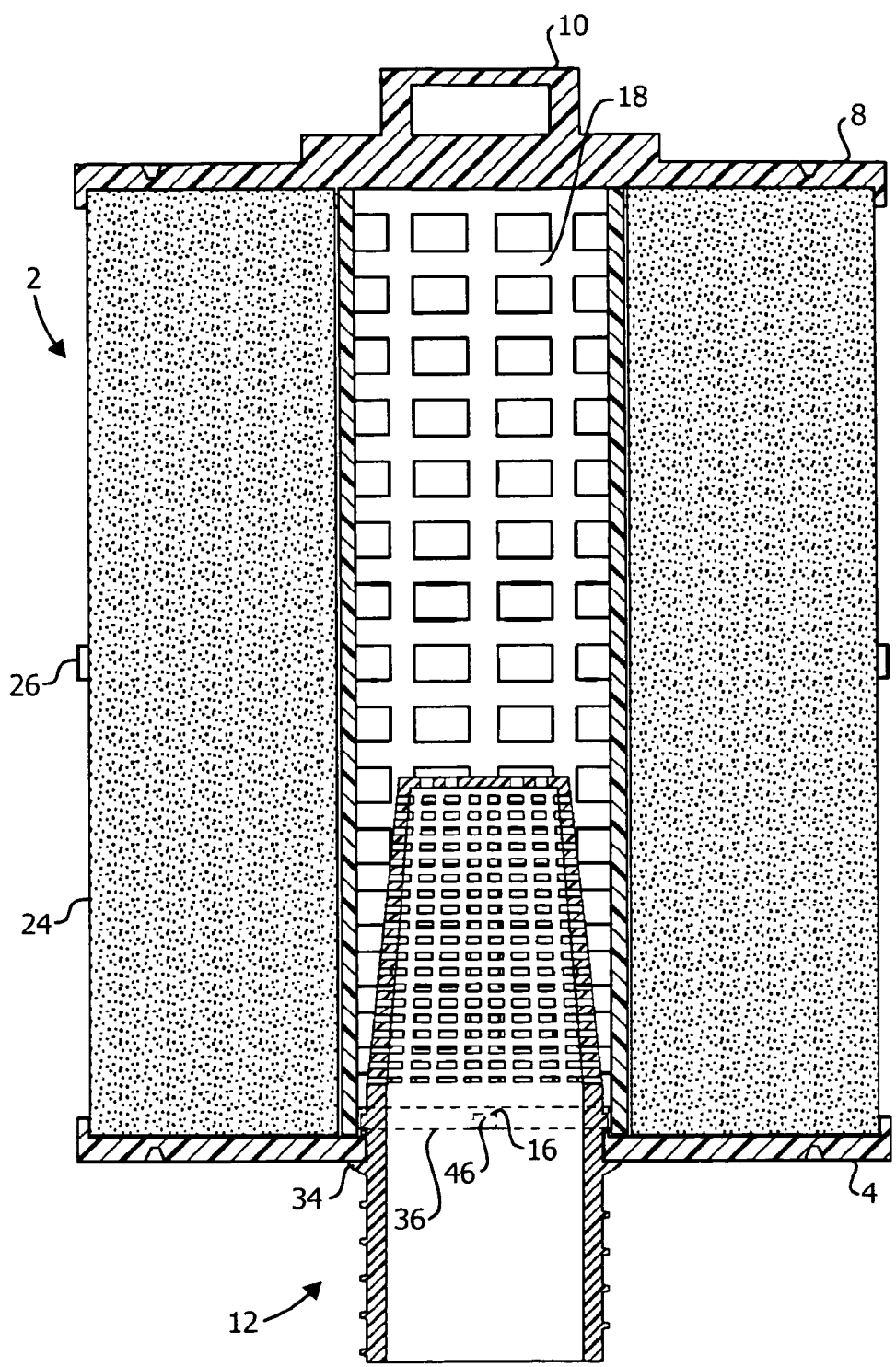
FIG. 13 is a cross-sectional view of the replacement filter cartridge assembly shown in FIG. 11, and an adaptor on which the filter cartridge assembly is removably mountable, illustrating the replacement filter cartridge assembly being mounted on the adaptor of the filtering apparatus in a second position.

Referring initially to FIGS. 3-6 of the drawings, it will be seen that a replacement filter cartridge assembly 2 constructed in accordance with a first form of the present invention includes a bottom end cap 4 having a central opening 6 formed through the thickness thereof, and a top end cap 8, preferably having a handle 10, although this is optional, extending from the outer surface thereof. The top end cap 8 is spaced apart and disposed axially opposite the bottom end cap 4. The handle 10 is provided so that a user may easily grasp the replacement filter cartridge assembly 2 and rotate it on a mating adaptor 12 of a filtering apparatus.

The bottom end cap 4 has at least one notched portion defining a notch 14 situated at the periphery of the central opening 6, but more preferably has two notched portions defining diametrically opposed notches 14 situated at the periphery of the central opening. These notches 14 receive prongs 16 of the mating adaptor 12, as will be described in greater detail.

The replacement filter cartridge assembly 2 includes a perforated, elongated core 18 extending axially between the top and bottom end caps 8, 4. The core 18 is preferably cylindrical in shape and has an internal diameter which is greater than that of the central opening 6 formed in the bottom end cap 4. Even more specifically, the core 18 has a first axial end 20 situated in proximity to the top end cap 8, and a second axial end 22 situated in proximity to the bottom end cap 4. The first and second axial ends 20, 22 are preferably respectively bonded to the top and bottom end caps 8, 4 during the process of molding the end caps. The tubular core 18 may be formed from polypropylene, polyvinylchloride (PVC), acrylonitrile-butadiene-styrene (ABS) plastic, or the like, and the end caps are preferably formed from polyurethane.

The replacement filter cartridge assembly 2 of the present invention includes a preferably pleated filter medium 24 situated between the top and bottom end caps 8, 4 and disposed circumferentially about the core 18. The pleated filter medium 24 may be made from a spun bonded 100% polyester that is commercially available under the trademark REEMAY®, or may be formed of a material exhibiting antimicrobial properties, for example, a filter medium which is commonly referred to by the trademark REEMAY ADVANTAGE® manufactured by BBA FIBERWEB™ of Nashville, Tenn. The REEMAY ADVANTAGE™ filter medium is made of spun bonded 100% polyester that is treated with MICROBAN® antimicrobial agents.

The top and bottom end caps 8, 4 are preferably affixed to opposite axial ends of the filter medium 24 by immersing the ends of the filter medium into a liquid, such as polyurethane, capable of hardening about the ends.

The filter cartridge assembly 2 may further include one or more bands 26 which are mounted circumferentially about the filter medium 24. The bands 26 may be formed from a spun bonded 100% polyester such as REEMAY® or the like.

The bands 26 are preferably attached to the filter medium 24 by gluing the bands around the circumference of the medium. The bands 26 assist in maintaining the cylindrical shape of the filter medium, and help to maintain separation between the pleats of the pleated filter medium 24.

The adaptor 12 of the filtering apparatus is provided for mating the replacement filter cartridge assembly 2 to the filtering apparatus and to allow the replacement filter cartridge assembly to be quickly installed and removed from the filtering apparatus. The adaptor 12 has a main body 28, which is generally cylindrical in shape. One axial end of the main body 28 includes a threaded base 30 for screwing the adaptor into the filtering apparatus. The opposite axial end of the main body 28 includes a perforated cage 32 which may prevent hair entrapment and a special recess hole or the like (not shown) for receiving and containing an ionizer cartridge which releases ions such as copper, silver or the like into the water. The main body 28 of the adaptor 12 further includes a flange 34 which extends radially outwardly from the outer circumference of the main body. The flange 34 contacts the outer surface of the bottom end cap 4 of the filter cartridge assembly 2 when the cartridge assembly is properly seated on the adaptor 12. The flange 34 and the bottom end cap 4 form a water tight seal.

The adaptor 12 further includes at least one, but more preferably, two diametrically opposed bayonet prongs 16 which extend radially outwardly from the outer circumference of the main body 28. The two prongs 16 are dimensioned to be received by the opposite notches 14 formed in the central opening 6 of the bottom end cap 4 of the replacement filter cartridge assembly 2. The prongs 16 of the adaptor and the notched central opening 6 of the bottom end cap 4 cooperate to define a bayonet-type locking structure.

In order to secure the filter cartridge assembly 2 to the filtering apparatus, the user simply grasps the filter cartridge assembly by the handle 10, if such is provided, on the top end cap 8, senses by feel the alignment of the notches 14 in the bottom end cap 4 with the prongs 16 of the adaptor 12, which is already screwed in place on the filtering apparatus, and rotates the filter cartridge to misalign the notched portions in the bottom end cap 4 with the adaptor prongs 16.

The replacement filter cartridge assembly 2 of the present invention includes an internal lock ring 36. The internal lock ring 36 is situated on the perforated core 18, and may be integrally molded with the core or may be a separate piece mounted thereto. More specifically, the internal lock ring 36 is situated at the second axial end 22 of the core 18 in proximity to the bottom end cap 4. The internal lock ring 36 has a surface which is engageable with the prong or prongs 16 of the adaptor 12 of the filtering apparatus to removably secure the replacement filter cartridge assembly 2 to the adaptor 12.

There are several embodiments of the internal lock ring 36 which will now be described in greater detail. The first is shown in FIGS. 3-6 of the drawings. In this first embodiment, the lock ring 36 includes a camming surface 38 on which the prong or prongs 16 of the adaptor of the filtering apparatus ride when the filter cartridge assembly 2 is tightened or loosened on the adaptor 12.

More specifically, with respect to this first embodiment, the internal lock ring 36 has at least one of its edges 40 cut at an angle in one or more places along its circumferential length so that the width of the lock ring varies circumferentially. The edge 40 of the lock ring 36 shown in FIG. 6 has a generally sinusoidal shape, although other edge shapes are envisioned to be within the scope of the present invention. Preferably, the width of the lock ring 36 is smallest at two diametrically opposed locations, and is greatest at two other diametrically opposed locations. The width of the lock ring 36 varies between the narrowest and widest portions thereof to define one or more camming surfaces 38 therebetween on which the prong or prongs 16 of the adaptor 12 of the filtering apparatus ride.

When manufacturing the filter cartridge assembly 2, the portions of the lock ring 36 which are narrowest are aligned with the diametrically opposed notches 14 formed in the bottom end cap 4 of the filter cartridge assembly, while the widest portions of the lock ring 36 are situated in non-alignment with the bottom end cap notches 14.

The width of the lock ring 36 at its narrowest portion is preferably such that it does not extend significantly outwardly of the inner surface of the bottom end cap 4 at the locations of the notched portions thereof. The widest portions of the lock ring 36 are positioned arcuately preferably 90° from the narrowest portions and, as mentioned previously, in non-alignment with the notches 14 formed in the bottom end cap 4. Accordingly, certain exposed edges of the lock ring 36 which act as camming surfaces 38 protrude outwardly from the inner surface of the bottom end cap 4 so that they are engageable by the prongs 16 of the adaptor 12 as the replacement filter cartridge assembly 2 is turned on the adaptor.

The replacement filter cartridge assembly 2 is placed on the adaptor 12 and turned until the notches 14 in the central opening 6 of the bottom end cap 4 align with the prongs 16 of the adaptor. The replacement filter cartridge assembly 2 is then pushed axially onto the adaptor 12, with the prongs 16 clearing the notched portions in the bottom end cap 4 until the flange 34 rests against the outer surface of the bottom end cap 4. Since the lock ring 36 is at its smallest width at the notches 14 in the bottom end cap 4, the ring 36 will not interfere with the prongs 16 of the adaptor 12 entering the notches in order to allow the replacement filter cartridge assembly 2 to be fully seated on the adaptor 12. The user then turns the filter cartridge assembly 2 on the adaptor 12. The prongs 16 of the adaptor 12 now engage and ride up over the camming surfaces 38 of the lock ring 36, which causes the filter cartridge assembly 2 to be drawn even tighter to the adaptor 12. The filter cartridge assembly is turned until a sufficient resistance is felt, which indicates that the prongs 16 reside near or at the widest portion of the lock ring 36, which generally occurs when the filter cartridge assembly 2 is turned 90° from the initial position where the adaptor prongs 16 are received by the notches 14 in the bottom end cap 4.

To replace the filter cartridge assembly 2 with a clean one, the user can rotate the filter cartridge assembly 90° in the opposite direction from when securing the cartridge assembly to the adaptor 12, or preferably may rotate the filter cartridge assembly another 90° in the same direction so as not to loosen the adaptor 12 threadingly attached in the filter apparatus. In either case, the prongs 16 of the adaptor 12 will ride back down the camming surfaces 38 of the lock ring 36 to a position where the prongs are in alignment with the notches 14 formed in the central opening 6 of the bottom end cap 4. The filter cartridge assembly 2 then may be pulled axially away from the adaptor 12 and discarded.

It should be noted here that, since the adaptor 12 is threadingly secured at its base 30 to another component by turning the adaptor in one direction, for example, clockwise when viewing the adaptor from its perforated cage 32, it is preferred that the user turn the replacement filter cartridge 2 in the same direction as for securing the adaptor 12 in place, e.g., clockwise, when both securing the cartridge assembly to and removing the cartridge assembly from the adaptor, so as not to inadvertently loosen the adaptor 12 from its mating component in the filtering apparatus.

The lock ring 36 of the present invention may also be constructed in accordance with a second embodiment. A replacement filter cartridge assembly 2 incorporating this alternative form of a lock ring 36 is shown in FIGS. 7 through 10 of the drawings. Here, like the first embodiment described in relation to FIGS. 3-6, the lock ring 36 may have varying widths about its circumference; however, in this particular embodiment, no camming surface need be included.

More specifically, the lock ring 36 includes at least one portion, but preferably two portions 42, which have a first width and at least another portion, and more preferably two other portions 44, which have a second width adjacent the first portions 42. The first portions 42 with the narrowest width are preferably diametrically opposite one another, and the second portions 44 with the widest width are preferably also diametrically opposite one another. Circumferentially, the lock ring 36 would have alternating first and second portions 42, 44, spaced apart 90° from each other.

The first portions 42 with the narrowest width are preferably situated in proximity to and in alignment with the notches 14 formed in the central opening 6 of the bottom end cap 4, and do not extend significantly outwardly from the inner surface of the bottom end cap. Thus, these portions 42 of the lock ring 36 do not interfere with the insertion of the adaptor prongs 16 into the notches 14 formed in the bottom end cap 4. The other portions 44 of the lock ring 36 having a greater width, on the other hand, are situated in misalignment with the notches 14 in the bottom end cap 4 and do extend a sufficient distance outwardly from the inner surface of the bottom end cap so as to contact the adaptor prongs 16 when the replacement filter cartridge assembly 2 is rotated on the adaptor.

Again, when mounting the filter cartridge assembly 2 to the filtering apparatus, the user senses when the notches 14 formed in the bottom end cap 4 are aligned with the prongs 16 of the adaptor 12. The user then pushes the replacement cartridge assembly axially onto the adaptor 12 until the prongs 16 clear the inner surface of the bottom end cap 4. The lock ring 36, when the filter cartridge assembly 2 is in this position, does not interfere with the prongs 16 entering the notches 14 formed in the bottom end cap 4. The user then turns the replacement filter cartridge assembly 2 either clockwise or counter-clockwise 90°. In this position, the free end surfaces 46 of the adaptor prongs 16 engage the radially inward surfaces 48 of the lock ring 36 at portions 44 where the width of the lock ring 36 is greater and extend outwardly beyond the inner surface of the bottom end cap 4. The lock ring 36 on the replacement filter cartridge assembly 2 creates an interference fit between the filter cartridge assembly and the adaptor 12 to minimize the chances of the filter cartridge assembly becoming dislodged inadvertently from the adaptor.

To replace the filter cartridge assembly 2, the user rotates the filter cartridge assembly 90° in either a clockwise or counter-clockwise direction until the notches 14 formed in the bottom end cap 4 are aligned with the prongs 16 of the adaptor 12. The filter cartridge assembly may then be removed from the adaptor 12 by pulling axially away from the adaptor so that the prongs 16 pass through the notches 14 formed in the bottom end cap 4.

The lock ring 36 of the present invention may also be formed with further alternative structure. A replacement filter cartridge assembly 2 constructed in accordance with the present invention and including a third embodiment of the lock ring 36 is shown in FIGS. 11-14 of the drawings. In this embodiment, the lock ring 36 may vary in thickness over portions thereof.

More specifically, the lock ring 36 of this third embodiment of the present invention includes at least one portion, and preferably two portions 50 that are diametrically opposite one another, that are relatively thin, and at least another portion, and more preferably at least two other portions 52 that are diametrically opposite one another, that are relatively thick. Thus, circumferentially, the lock ring of the present invention will include alternating thick and thin portions 52, 50 spaced apart 90° from one another. The transition between a thick portion 52 and a thin portion 50, and between a thin portion 50 and a thick portion 52, of the lock ring 36 may be gradual, to provide a camming surface, or may be stepped.

The thin portions 50 of the lock ring 36 are preferably situated to be aligned with the notches 14 formed in the bottom end cap 4 so that the thin portions 50 do not interfere with the insertion of the adaptor prongs 16 into the notches 14 of the bottom end cap 4 when the replacement filter cartridge assembly is being mounted on the adaptor. Similarly, the thicker portions 52 of the lock ring 36 are positioned to be in non-alignment with the notches 14 of the bottom end cap 4. These thicker portions 52 will engage the prongs 16 of the adaptor 12 at their outermost free end surfaces 46 and create an interference fit with the adaptor 12 to secure the filter cartridge assembly 2 onto the adaptor of the filtering apparatus.

In order to mount the replacement filter cartridge assembly 2 in the filtering apparatus, the user aligns the notches 14 in the bottom end cap 4 of the filter cartridge assembly with the prongs 16 on the adaptor 12, and pushes axially on the filter cartridge assembly towards the adaptor until the prongs 16 clear the inner surface of the bottom end cap 4 and the outer surface of the bottom end cap engages the flange 34 on the adaptor. The lock ring 36, which is relatively thin at portions 50 nearest the notches 14 in the bottom end cap 4, will not interfere with entry of the adaptor prongs 16 into the notches. The user then turns the replacement filter cartridge assembly 2 either clockwise or counter-clockwise by 90° or until greater resistance is felt. In this position, the lock ring 36 at portions 52 of greater thickness engages the outermost free end surfaces 46 of the adaptor prongs 16 and exerts pressure on the prongs to create an interference fit between the bottom end cap 4 and the adaptor 12, thus securing the replacement filter cartridge assembly 2 in place on the adaptor and minimizing the chance of the filter cartridge assembly becoming dislodged from the adaptor inadvertently.

In order to remove and replace the filter cartridge assembly 2, the user again turns the replacement filter cartridge assembly either clockwise or counter-clockwise by 90° or until the notches 14 formed in the bottom end cap 4 are aligned with the prongs 16 on the adaptor 12. The user then pulls the filter cartridge assembly 2 axially away from the adaptor 12, with the prongs 16 passing through the notches 14 on the bottom end cap, thus freeing the filter cartridge assembly from its mounting on the adaptor.

Figure 14:
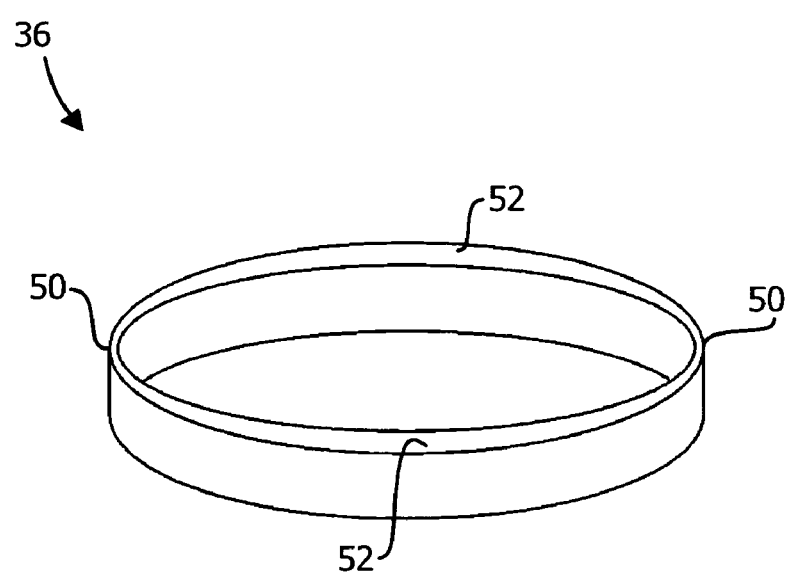
FIG. 14 is a perspective view of a component of the replacement filter cartridge assembly shown in FIGS. 11-13 for releasably locking the replacement filter cartridge assembly to the adaptor of the filtering apparatus.
Figure 15:
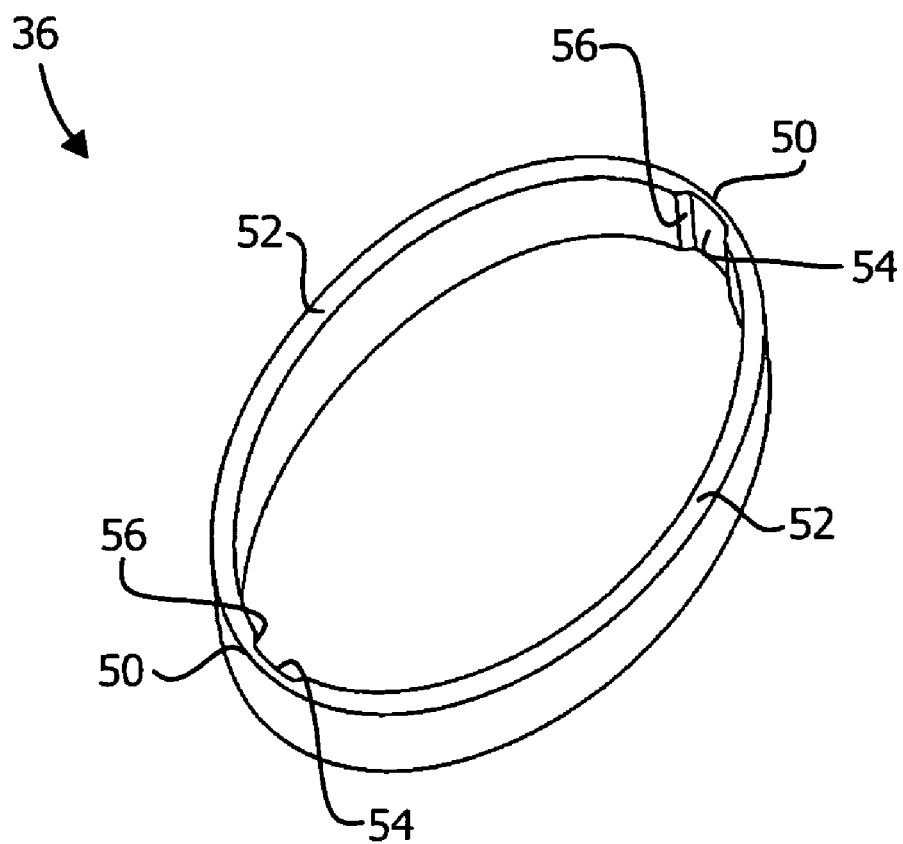
FIG. 15 is a perspective view of an alternative version of the component shown in FIG. 14 of the replacement filter cartridge assembly of the present invention.

FIG. 15 is an alternative version of the lock ring 36 shown in FIG. 14 of the drawings. This version of the lock ring 36 also includes thicker portions 52 and thinner portions 50 positioned as described previously with respect to the embodiment of the lock ring 36 shown in FIG. 14. The lock ring may have a generally uniform thickness into which recessed portions 54 of the radially inner surface of the lock ring 36 are formed to define recesses preferably diametrically opposite one another, thereby defining the lock ring 36 with thinner walled portions 50. Again, the thinner portions 50 of the lock ring are aligned with the notches 14 formed in the bottom end cap 4, so that the thinner portions 50 of the lock-ring 36 do not create an interference fit with the prongs 16 of the adaptor 12 when the adaptor is inserted into the circular opening 6 formed in the bottom end cap 4. The transition between the thinner portions 50 and thicker portions 52 may be a step, or a gradual, sloped surface 56, as shown in FIG. 15. The adaptor 12, when turned 90° from its initial insertion position shown in FIG. 12, will have its prongs 16, and in particular the outermost ends 46 thereof, engaging the thicker portions 52 of the lock ring 36, resulting in an interference fit between the lock ring 36 and the adaptor 12 to minimize any chance that the replacement filter cartridge assembly 2 of the present invention becomes inadvertently dislodged from the adaptor 12 of the filtering apparatus.

The lock ring 36 may also simply be formed as a cylindrical ring with uniform thickness and width and either separately or integrally with the central core 18. It is situated with respect to the central opening 6 in the bottom end cap 4 to provide a sufficient interference fit between the replacement filter cartridge assembly 2 and the adaptor 12 that will not prevent the adaptor prongs 16 from entering the notches 14 in the bottom end cap or the filter cartridge assembly from being rotated to a locked position (where the adaptor prongs 16 are in non-alignment with the notches 14 in the bottom end cap 4) to secure the replacement filter cartridge assembly 2 onto the adaptor 12 of the filtering apparatus. However, to maintain such interference fit between the adaptor prongs 16 and the replacement filter cartridge assembly 2, the lock ring 36 is preferably made from a material, such as linear high density polypropylene, having a lower coefficient of expansion than that of the end caps 4, 8 of the filter cartridge assembly. Even more preferably, the lock ring 36 is made from a material having a coefficient of expansion which is equal or close to that of the adaptor 12 or other fitting on which the filter cartridge assembly is mounted. Under such circumstances, even with the high temperature water found in a hot tub, spa or other heated aquatic environments, and even if the bottom end cap 4 of the replacement filter cartridge assembly 2 softens and enlarges under such heated conditions, the internal lock ring 36, with its lower coefficient of expansion, will not significantly increase in diameter and will remain engaged with the adaptor prongs 16 and continue to provide an interference fit between the replacement filter cartridge assembly 2 and the adaptor 12. This structure will minimize the chances of the replacement filter cartridge assembly 2 from becoming inadvertently dislodged from the adaptor 12 of the filtering apparatus.

Another advantage of using the internal lock ring 36 in the replacement filter cartridge assembly 2 of the present invention is that it decreases the demolding time for making the filter cartridge assembly end caps 4, 8. Without the lock ring 36, the end caps had to be left in the mold a relatively long time after curing (approximately 20 minutes) until they are sufficiently cooled before being removed therefrom. If the end caps, and especially the bottom end cap 4, was removed from the mold prematurely, the end cap would shrink and would not fit onto the adaptor 12.

The lock ring 36 is preferably placed with the core 18 in the mold while the end cap 4 is being formed and acts as a restrictor. The molded end cap 4, with the lock ring 36 in place, may be removed from the mold sooner than normal, even before being cooled, and the lock ring will maintain the integrity of the end cap and more specifically will retain the dimensions of the central opening 6 formed in the end cap 4 so that the polyurethane end cap can continue to cure out of the mold without affecting its ability to fit closely onto the adaptor 12 of the filtering apparatus.

As can be seen from the foregoing description, the lock ring 36 of the present invention not only ensures that a replacement filter cartridge assembly 2 will not become dislodged inadvertently from the adaptor 12 of the filtering apparatus in heated water environments, such as hot tubs and spas, but also decreases the demolding time in the manufacturing process for the replacement filter cartridge assembly 2. By selecting a lock ring 36 with a coefficient of expansion which is closer to that of the adaptor 12, or with the camming surface 38 shown in FIG. 6, or with the different widths shown in FIG. 10 or with the different thicknesses shown in FIG. 14, the lock ring will minimize the chances of the replacement filter cartridge assembly 2 becoming dislodged from the adaptor 12 of the filtering apparatus inadvertently.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A replacement filter cartridge assembly removably rotatably attachable to a mating adaptor of a filtering apparatus, the mating adaptor having a main body and at least one prong extending outwardly from the main body, the replacement filter cartridge assembly comprising:
    a first end cap;
    a second end cap disposed axially opposite the first end cap, the second end cap having a central opening formed through the thickness thereof and further having at least one notched portion defining a notch situated at the periphery of the central opening for receiving the at least one prong of the adaptor;
    a perforated elongated core extending axially between the first and second end caps, the core having a first axial end situated in proximity to the first end cap and a second axial end situated in proximity to the second end cap;
    a pleated filter medium situated between the first and second end caps and disposed circumferentially about the core; and
    an internal lock ring, the internal lock ring being situated on the core at the second axial end thereof, the internal lock ring having a surface engageable with the at least one prong of the adaptor to removably secure the replacement filter cartridge assembly to the adaptor.

2. A replacement filter cartridge assembly as defined by claim 1, wherein the surface of the lock ring which is engageable with the at least one prong of the adaptor includes a camming surface.

3. A replacement filter cartridge assembly as defined by claim 2, wherein the second end cap generally resides in a plane, and wherein the camming surface of the lock ring is at an acute angle with respect to the plane in which the second end cap resides, the camming surface engaging the at least one prong of the adaptor when the filter cartridge assembly is rotatably attached to the adaptor.

4. A replacement filter cartridge assembly as defined by claim 1, wherein the internal lock ring includes at least a first portion having a first width and a second portion having a second width adjacent the first portion, the at least first portion being in alignment with the at least one notched portion of the second end cap, and the second portion being in non-alignment with the at least one notched portion of the second end cap, the second width of the second portion being greater than the first width of the first portion.

5. A replacement filter cartridge assembly as defined by claim 1, wherein the internal lock ring includes at least a first portion having a first thickness and a second portion having a second thickness adjacent the first portion, the at least first portion being in alignment with the at least one notched portion of the second end cap, and the second portion being in non-alignment with the at least one notched portion of the second end cap, the second thickness of the second portion being greater than the first thickness of the first portion.

6. A replacement filter cartridge assembly as defined by claim 1, wherein the second end cap is made from a material having a first coefficient of expansion, and wherein the internal lock ring is made from a material having a second coefficient of expansion, the second coefficient of expansion of the lock ring being less than the first coefficient of expansion of the second end cap.

* * * * *